United States Patent [19]

Saiz

[11] Patent Number: 5,895,015
[45] Date of Patent: Apr. 20, 1999

[54] AUTOMATIC FLAP

[76] Inventor: Manuel Munoz Saiz, San Emilio 16, 1-3, 28017, Madrid, Spain

[21] Appl. No.: 08/757,994
[22] Filed: Nov. 27, 1996
[30] Foreign Application Priority Data Nov. 14, 1996 [ES] Spain .................. 9602398

[51] Int. Cl.$^6$ .................. B64C 3/50
[52] U.S. Cl. .................. 244/215; 244/90 A; 244/90 R; 416/131; 416/135
[58] Field of Search .................. 244/23 D, 90 A, 244/90 R, 113, 215; 416/140 A, 140 R, 131, 135 R, 135 A, 135 B, 136, 137

[56] References Cited

U.S. PATENT DOCUMENTS

| | | |
|---|---|---|
| 1,504,663 | 8/1924 | Wright et al. . |
| 1,858,259 | 5/1932 | Alfaro . |
| 1,973,017 | 9/1934 | Rothenhoefer . |
| 3,120,935 | 2/1964 | Perrin . |
| 4,270,712 | 6/1981 | von der Decken et al. . |
| 4,566,657 | 1/1986 | Grow . |
| 4,693,437 | 9/1987 | Khachikian . |
| 5,570,859 | 11/1996 | Quandt . |

FOREIGN PATENT DOCUMENTS 501463  2/1939  United Kingdom .................. 244/113

Primary Examiner—Charles T. Jordan
Assistant Examiner—Tien Dinh
Attorney, Agent, or Firm—Robert M. Schwartz, P.A.; Robert M. Schwartz; Loren D. Pearson

[57] ABSTRACT

An automatic flap that uses on each wing two adjacent fins, one of which is smaller and is located on the middle or front of the wing, the other, which is larger, on the bottom rear of the wing, with a shaft in the common eccentric zone linking the two fins, said shaft being parallel to the axis of the wing, having the fins different resistance to the ram air, creating a rotation torque as a function of the aircraft's speed, when retracted, they are shaped so that the front or top fin adapts to the upper surface of the wing and the rear or bottom fin adapts to the lower surface so that, together with the wing, they form an aerodynamic profile, there are attachment arms between the two fins, and bands or springs to assist or complement the action of the smaller fin whose resistance is such that, at low speed, the flap remains extended.

14 Claims, 2 Drawing Sheets

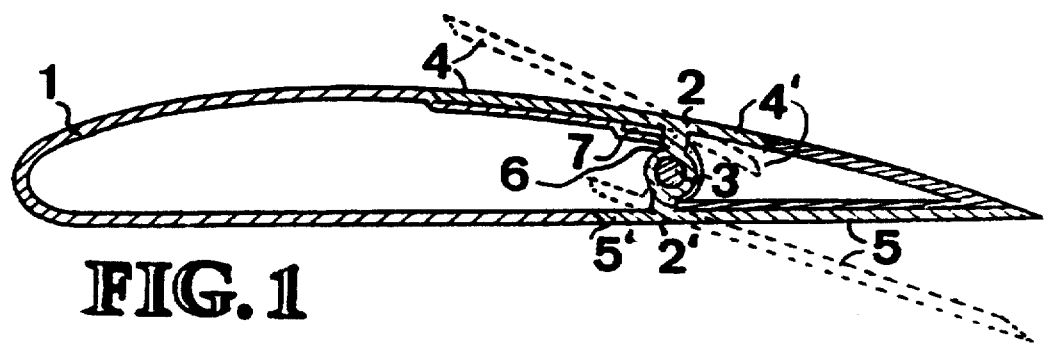
FIG. 1
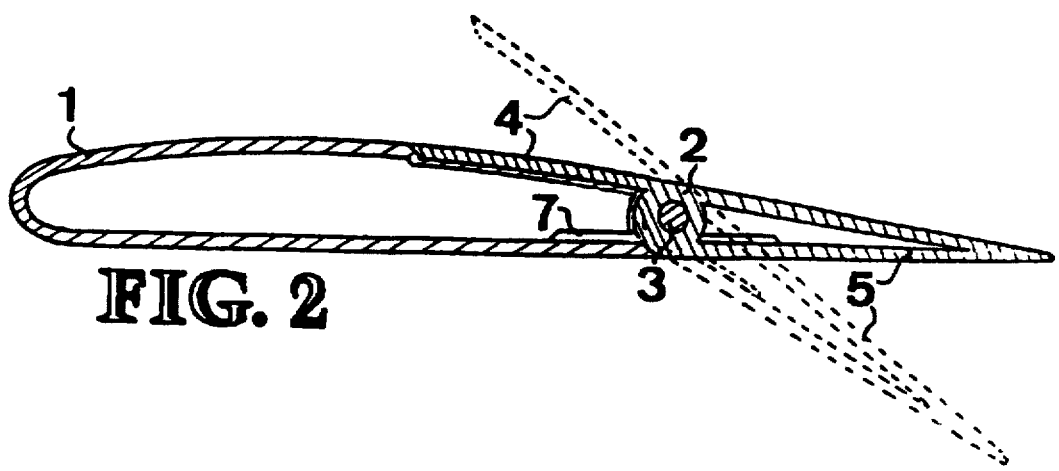
FIG. 2
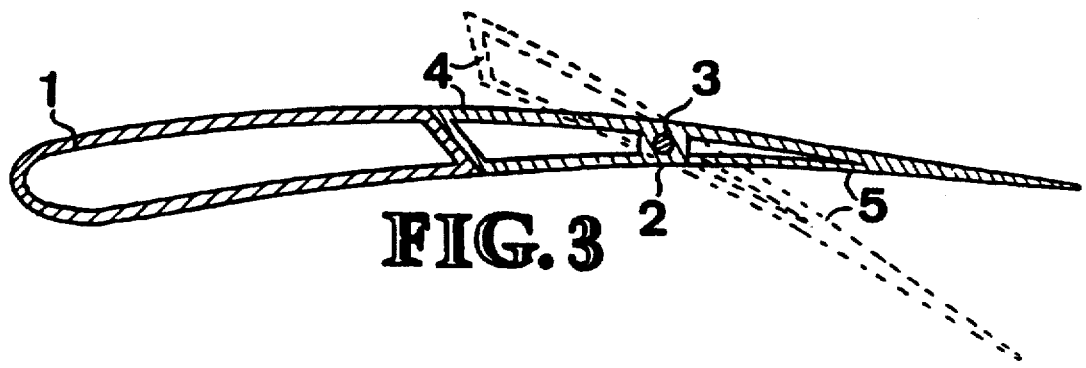
FIG. 3
FIG. 4
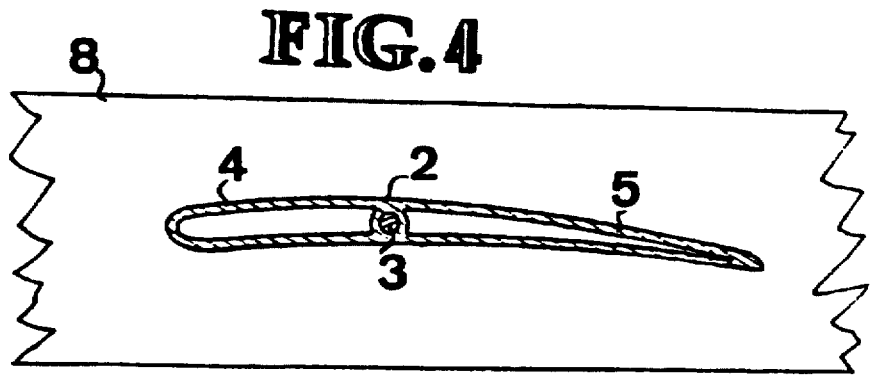

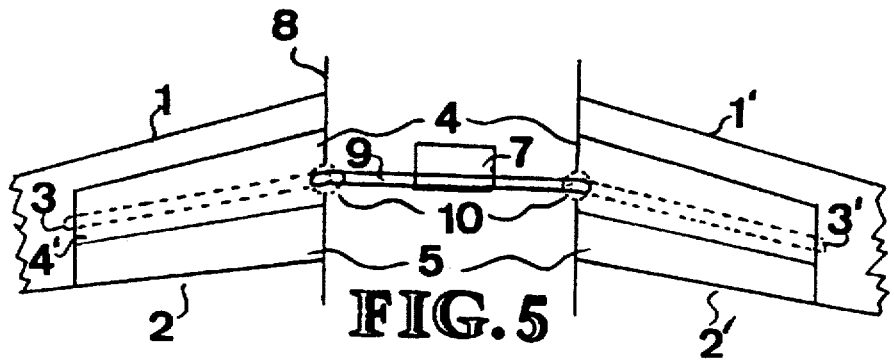
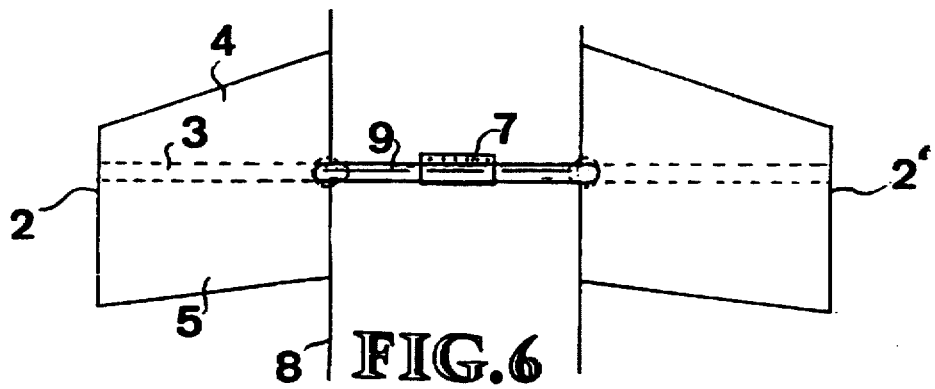
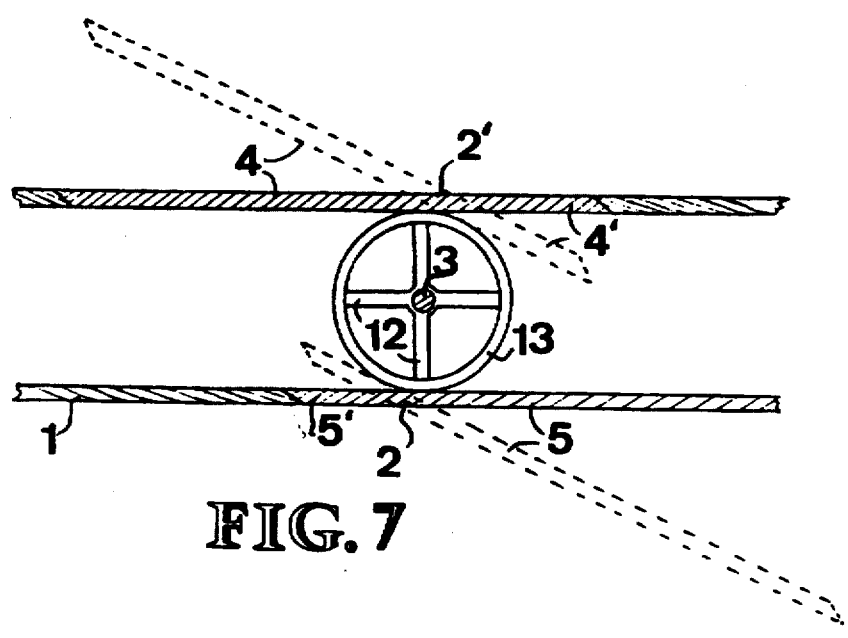

5,895,015

1
AUTOMATIC FLAP

BACKGROUND OF THE INVENTION

1. Field of the Invention

This invention refers to a high-lift aircraft flap necessary for low-speed flight.

2. Description of the State of the Technique

At present, flaps are manually operated and controlled by complex, duplicated and heavy devices or when they are automatic they need a big force or big springs for the actuation.

BRIEF DESCRIPTION OF THE INVENTION

The automatic flap of this invention consists of the use on each wing of two adjacent fins, one of which is smaller and is located on the top middle or front of the wing, the other, which is larger, on the bottom rear of the wing, with a shaft in the common eccentric zone linking the two fins, said shaft being parallel to the axis of the wing or parallel to the transversal axis of the aircraft. Said fins have different resistance to the ram air, creating a rotation torque as a function of the aircraft's speed When retracted, they are shaped so that the front or top fin adapts to the upper surface of the wing and rear or bottom fin adapts to the lower surface so that, together with the wing, they form an aerodynamic profile There are attachment arms between the two fins, and bands or springs to assist or complement the action of the smaller fin whose resistance is such that, at low speed, the flap remains extended. The rotation shaft is close to the central zone, enabling the flap to turn under very little force, using very small springs.

The fins have prolongations in the opposite direction to the shaft, allowing them to fit to the wing surface when the flap is retracted.

One variant has a rear or larger fin coinciding with or forming an integral part of the back of the wing In another variant, each fin coincides with or is an integral part of the back of the swept wing.

A further variant consists of flaps completely outside the wing and fitted on the side of the fuselage, in which case the shafts for each pair of flaps, one on each side of the fuselage, are connected by a common tubular shafts In the last two cases, the bands or springs are preferably located in the central part of the connecting tube or shaft.

Another variant makes use around the shaft of a cylindrical drum to secure the fins tangentially.

Small springs allow the flap to be centered in the fully retracted position.

The flap size, whether of one or more elements, provides a large surface, to allow for greater lift without the need for wing slots or leading edge flaps.

The mechanical resistance of the flexing of ailerons and springs, as required, may be linear, exponential or any other desired, operating throughout the movement or only in a low-speed zone.

In some cases, a small, conventional operated additional flap may be necessary.

With hallow flaps, hot air is made to flow through them to heat them, emerging through holes, otherwise the zone of the wing close or adjacent to the flap can be heated Advantages: There is no need for controls,, actuators, articulations in some cases, asymmetry protection or its alternative systems, training, it is lighter, simpler and more economical It operates constantly and not by sectors as at present The rotation shaft is close to the central zone, enabling the flap to operate under very little force, using very small springs.

BRIEF DESCRIPTION OF THE DRAWINGS

FIG. 1 shows a cross-sectional view revealing the aerodynamic profile of a wing with the flap of the invention.

FIG. 2 shows a cross-sectional view of a variant of the invention.

FIG. 3 shows a cross-sectional view of another variant

FIG. 4 shows a lateral cross-sectional view of a portion of wing with a variant of the flap.

FIG. 5 shows a top view of a portion of a wing and the flap shown in FIG. 1.

FIG. 6 shows a top view of the flap shown in FIG. 4 an a portion of fuselage

FIG. 7 shows a cross-sectional view showing the attachment between both flap fins.

DESCRIPTION AND DETAILED OPERATION IN THE DRAWINGS

FIG. 1 consists of the wing 1, the flap 2 and 2', the shaft 3, the small fin 4 located on the top of the wing and its prolongation 4', the longer fin 5 located on the bottom of the wing and its prolongation 5', the fastening or union bars of the fins 6, and the band or spring 7. The dotted area shows the flap at low speed in an extended or slightly retracted position.

FIG. 2 consists of the wing 1, the flap 2, the shaft 3, the front fin 4, the rear fin 5 which is an integral part of the back of the swept wing and the spring 7. The dotted area shows the flap at low speed.

FIG. 3 consists of the wing 1, the flap 2 which is an integral part of the back of the swept wing, the shaft 3, the front fin 4, and the rear fin 5. The dotted area shows the flap at low speed.

FIG. 4 consists of the flap 2 independent of the wing, the front fin 4, the rear fin 5 and the fuselage 8.

FIG. 5 consists of the wings 1 and 1', the flaps 2 and 2', the shafts 3 and 3', the front fins 4 and their prolongations 4', the rear fins 5, located below the wings, the band or spring 7, the fuselage 8, the connecting tube 9 and the universal joints 10.

FIG. 6 consists of the flaps 2 and 2', the shaft 3, the front fin 4, the rear fins 5, the band or spring 7 and the tube 9 that interconnects the shafts.

FIG. 7 consists of the wing 1, the flap 2 and 2', the shaft 3, the front fin 4 and its prolongation 4', the rear fin 5 and its prolongation 51 and the radial arms 12 of a cylindrical drum to secure the fins tangentially Operation: with the aircraft stopped and approximately up to the initial ascent speed, the flaps are fully extended or slightly retracted, depending on the type of spring used. During acceleration, retraction continues or begins until, at about 250 knots, in sub-sonic jets, the flap will be completely retracted. This continues during cruising flight; if speed drops for any reason, the flaps extend fully or partly without control or actuators because of the spring. During descent or approach they also extend as speed drops, linearly or exponentially, depending on the type of spring or flap used. Under approximately 200 knots, they are fully or almost fully extended.

Lift can be increased or decreased by altering the aircraft's angle of attack or pitch.

The flaps always extend automatically and simultaneously or in synchronization in both wings, with not external control mechanism, in all cases as a function of the aircraft speed and its angle of attack.

What is claimed is:

1. An automatic flap on an airplane wings subject to ram air in flight as while moving, characterized by using two adjacent and connected fins, the first is smaller and is located on the top middle portion of said wing, the second is larger than said first fin and is located on the bottom rear of the wing, with a shaft in a common eccentric zone linking said two fins, said shaft being parallel to the an axis of said wing, having said fins with different resistance to said ram air, creating a rotation torque as a function of the aircraft's speed, when retracted said fins are shaped so that said first fin adapts to the upper surface of the wing and said second fin adapts to the lower surface of said wing so that, together with the wing they form an aerodynamic profile, there are attachment arms between the two fins, and bands to assist the action of said first fin whose resistance is such that, at low speed, the flap remains extended.

2. An automatic flap, as in claim 1, said fins having prolongations in the opposite direction to the shaft, allowing them to fit to the wing surface when the flap is retracted.

3. An automatic flap, as in claim 1, where said fin coincides with and forms an integral part of the back of said wing.

4. An automatic flap, as in claim 1, said fins are an integral part of the back of a swept wing.

5. An automatic flap, as in claim 1, having the flaps completely outside the wing and fitted on the side of the fuselage, in which case the shafts for each pair of flaps, one on each side of the fuselage, are connected by a common tubular shaft.

6. An automatic flap, as in claim 1, having the bands preferably located in the central part of the connecting shaft.

7. An automatic flap, as in claim 4, having the bands preferably located in the central part of the connecting shaft.

8. An automatic flap, as in claim 5, having the bands preferably located in the central part of the connecting shaft.

9. An automatic flap, is in claim 1, having the mechanical resistance of the band of linear type.

10. An automatic flap, as in claim 1, having a mechanical resistance of the band of exponential type.

11. An automatic flap, as in claim 1, having the band acting only at low speed.

12. An automatic flap, as in claim 1, having the shaft parallel to a transversal axis of the aircraft.

13. An automatic flap as stated in claim 1 wherein two fins are used on each wing of an airplane.

14. An automatic flap as described in claim 1, further comprising a cylindrical drum, wherein the fins are attached tangentially to the wall of said drum and said drum can rotate on a shaft to deploy and retract said fins.

* * * * *